(12) United States Patent
Chivers et al.

(10) Patent No.: US 6,339,053 B1
(45) Date of Patent: Jan. 15, 2002

(54) AQUEOUS COMPOSITION FOR REMOVING COATINGS

(75) Inventors: Ivor M. Chivers, Winscombe; Paul A. Reynolds, Winford, both of (GB)

(73) Assignee: Eco Solutions Limited (GB)

(*) Notice: Subject to any disclaimer, the term of this patent is extended or adjusted under 35 U.S.C. 154(b) by 0 days.

(21) Appl. No.: 09/646,378

(22) PCT Filed: Mar. 19, 1999

(86) PCT No.: PCT/GB99/00882

§ 371 Date: Nov. 16, 2000

§ 102(e) Date: Nov. 16, 2000

(87) PCT Pub. No.: WO99/47614

PCT Pub. Date: Sep. 23, 1999

(30) Foreign Application Priority Data

Mar. 19, 1998 (GB) .............................................. 9805930
Aug. 10, 1998 (GB) .............................................. 9817377

(51) Int. Cl.⁷ .............................. C09D 9/04; C11D 3/36; C11D 1/722
(52) U.S. Cl. ....................... 510/201; 510/202; 510/203; 510/206; 510/209; 510/211; 510/242; 510/417; 510/432; 510/469; 510/431; 510/413; 510/421; 516/76; 516/199; 134/38
(58) Field of Search ................................. 510/201, 202, 510/203, 206, 209, 211, 242, 417, 432, 469, 431, 413, 421; 516/76, 199; 134/38

(56) References Cited

U.S. PATENT DOCUMENTS

| | | | |
|---|---|---|---|
| 4,070,510 A | 1/1978 | Kahn | 427/385 R |
| 4,071,645 A | 1/1978 | Kahn | 427/340 |
| 4,769,170 A | 9/1988 | Omori et al. | 252/107 |
| 4,927,556 A | 5/1990 | Pokorny | 252/173 |
| 5,246,503 A | 9/1993 | Minick | 134/38 |
| 5,348,680 A | 9/1994 | Maitz | 252/162 |
| 5,382,376 A | 1/1995 | Michael et al. | 252/153 |
| 5,560,806 A | 10/1996 | Li et al. | 162/5 |
| 5,565,136 A | 10/1996 | Walsh | 510/203 |
| 6,153,573 A | * 11/2000 | Reynolds | 510/203 |

FOREIGN PATENT DOCUMENTS

| | | |
|---|---|---|
| DE | 3438399 C1 | 10/1984 |
| EP | 0 052 275 A | 5/1982 |
| EP | 0 294 041 A | 12/1988 |
| EP | 0 376 687 | 12/1989 |
| EP | 0 389 829 A | 10/1990 |
| EP | 0 442271 A1 | 1/1991 |
| EP | 0 407 952 B1 | 2/1994 |
| EP | 0 590 722 A | 4/1994 |
| EP | 0 648 820 A2 | 10/1994 |
| GB | 1229778 | 8/1969 |
| JP | 57-83598 | 11/1980 |
| WO | WO 90/08603 | 2/1989 |
| WO | WO 92/05224 | 9/1991 |
| WO | WO 93 07227 A | 4/1993 |
| WO | WO 94/17143 | 1/1994 |
| WO | WO 94/29392 | 12/1994 |
| WO | 97/24409 | * 7/1997 |
| WO | WO 97 24409 | 7/1997 |

* cited by examiner

Primary Examiner—Charles Boyer
(74) Attorney, Agent, or Firm—Welsh & Katz, Ltd.

(57) ABSTRACT

An aqueous composition for softening or removing organic coatings comprises: (a) an effective amount of a mixture of (a1) at least one non-toxic compound of formula (I). Wherein R, $R^1$ and $R^2$ which may be the same or different, represent lower alkyl, phenyl or lower alkyl-phenyl groups (e.g. triethlyphosphate) and (a2) at least one non-toxic lower alkyl ester of a $C_{2-20}$ carboxylic acid or at least one non-toxic $C_{4-12}$ alkanol (e.g. diethyl succinate, diethyl succinate, diethyl adipate. 1,2,3-propanetriol triacetate, tri-n-butyl citrate, n-octyl acetate or methyl octanoate)(b) an effective amount of at least one surfactant to allow the composition to exist as a stable emulsion. The surfactant(s) being selected nonionic water-soluble block compolymers of more than one alkylene oxide (e.g. Synperonic PE™ (F-series)): and (c) water, characterized in that component (c) (water) is present in an amount of less than about 50% by weight and/or volume of component (a) and in that the composition exists as a stable microemulsion.

23 Claims, No Drawings

AQUEOUS COMPOSITION FOR REMOVING COATINGS

The present invention relates to an aqueous composition for removing organic coatings from a surface.

PCT Patent Application No. WO 97124409 (Eco Solutions Limited) (the disclosure of which is incorporated herein by reference) discloses a predominantly aqueous composition for plasticising or softening paint, varnish and similar coatings prior to stripping the coating from a surface, comprising preferably:

(a) an effective amount of a mixture of (a1) at least one non-toxic compound of formula I

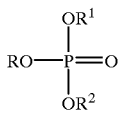

wherein R,R$^1$ and R$^2$, which may be the same or different, represent lower alkyl, phenyl or lower alkyl-phenyl groups and (a2) at least one non-toxic lower alkyl ester (including diester) of a $C_{2-20}$ carboxylic acid or at least one non-toxic $C_{4-12}$ alkanol;

(b) an effective amount of at least one surfactant to allow the composition to exist as a stable emulsion, the surfactant(s) being selected from nonionic water-soluble block copolymers of more than one alkylene oxide; and (c) water in an amount sufficient to comprise the major portion of the composition.

Japanese Patent Application Kokai No. 55-157740 (1980) (Ube Kyosan K.K.) (the disclosure of which is incorporated herein by reference) discloses a predominantly aqueous composition described as a liquid detergent for removing a variety of stains and coatings from hard surfaces, comprising from 1 to 20% by weight of succinic acid diester, from 0.1 to 5 (but not including 5) % by weight of anionic surfactant, from 1 to 40% by weight of nonionic surfactant and from 60 to 95% by weight of water.

EP-A-0294041 (Minnesota Mining and Manufacturing Company) (the disclosure of which is incorporated herein by reference) discloses a predominantly aqueous composition for removing coatings such as paint, containing up to about 50% by weight of dibasic acid esters, small amounts of thickening agents (clay/cellulose mixtures), and at least about 50% weight of water, together with additional ingredients such as surfactants.

EP-A-0407952 (Georg Scheidl Jr. GmbH) (the disclosure of which is incorporated herein by reference) discloses a viscous, pasty or gel-like aqueous composition, said to be an improvement on the compositions of EP-A-0294041, in which the paint-softening "solvents" generally comprise 20 to 60% by weight of the composition, preferably 30 to 45%, the remainder of the composition being an aqueous solution of common surfactants with one or more common thickeners. Dibasic esters are generally indicated as possible "solvents", although none is specifically mentioned. Laponite RD is exemplified (Examples G, H and I) as an example of a common thickener.

The prior art compositions described above have limitations from a commercial point of view. The active and surfactant components are speciality chemicals which are not available worldwide. As a result, it can be desirable to transport the compositions in order to supply the less industrialised countries. The high water content is undesirable, as it is clearly inefficient to transport large quantities of water by aircraft, truck or ship. On the other hand, it has not hitherto been possible to obtain a composition with lower water content that has an activity equal to or better than traditional solvent-based (e.g. methylene chloride) coating removers.

DE-A-3438399 (Chemische Werke Kluthe GmbH & Co.) (the disclosure of which is incorporated herein by reference) discloses generally an aqueous paint-stripping agent containing methyl and/or ethyl and/or propyl and/or butyl esters of succinic acid and/or glutaric acid and/or adipic acid and provides an example (Example 1) of such a composition in which there is a total of 66% by weight dibasic acid esters (dimethyl succinate, dimethyl glutarate and dimethyl adipate), 2% by weight of an organic thickening agent (cellulose acetobutyrate) and 5% by weight of water, together with additional ingredients such as surfactants. However, as evidenced by data contained in EP-A-0294041, such a composition is less effective than a conventional methylene chloride paint stripper.

EP-A-0648820 (Qyentos Corporation) (the disclosure of which is incorporated herein by reference) discloses further aqueous compositions employing rather low levels of water and high levels of active and carrier organics (e.g. dimethyl succinate, dimethyl adipate and dimethyl glutarate) dispersed in the water by means of surfactants. As potential surfactants there are generally mentioned alkylene-oxide (ethylene oxide or propylene oxide) added type nonionic surface active agents.

Neither of these prior art documents offers a concentrated cleaning fluid that can constitute a suitable concentrate for shipping prior to dilution with water to yield a diluted formulation with retained activity.

Therefore, in the field of household or commercial preparations which soften or remove an organic coating such as paint, varnish, grease, ink or dirt, there is a continuing need for a concentrated fluid that is preferably clear and non-streaking, effective against a wide range of coatings, and capable, if desired, of being diluted and optionally thickened without substantial loss of activity.

According to the present invention, there is provided an aqueous composition for softening or removing organic coatings, the composition comprising:

(a) an effective amount of a mixture of (a1) at least one non-toxic compound of formula I

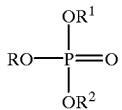

wherein R,R$^1$ and R$^2$, which may be the same or different, represent lower alkyl, phenyl or lower alkyl-phenyl groups and (a2) at least one non-toxic lower alkyl ester of a $C_{2-2}$ carboxylic acid or at least one non-toxic $C_{4-12}$ alkanol;

(b) an effective amount of at least one surfactant to allow the composition to exist as a stable emulsion, the surfactant (s) being selected from nonionic water-soluble block copolymers of more than one alkylene oxide; and (c) water;

characterised in that component (c) (water) is present in an amount of less than about 50% by weight and/or volume of component (a) and in that the composition exists as a stable microemulsion.

It should be noted that the phrase "stable emulsion" or "stable microemulsion" used herein refers particularly to an emulsion or microemulsion which is stable with respect to separation into unemulsified phases over a period of time normally required for such a composition, typically a few weeks or months. The word "microemulsion" refers to emulsions, including suspensions and dispersions, in which the emulsified droplets are of a size less than about 0.1 μm, so that no milkiness results.

The term "lower alkyl" refers in particular to alkyl groups containing up to about 8 carbon atoms, for example methyl, ethyl, n-propyl, s-propyl, n-butyl, s-butyl, t-butyl, pentyl and hexyl groups. Such alkyl groups may optionally be mono- or poly-substituted, for example by one or more substituents selected from halo, nitro, amino, $C_{1-4}$ alkylamino, di-$C_{1-4}$ alkylamino, hydroxy, $C_{1-4}$ alkoxy, carboxy, ($C_{1-4}$ alkyl) carbonyl, ($C_{1-4}$alkoxy)-carbonyl, $C_{2-4}$ alkanoyloxy, ($C_{1-4}$ alkyl)carbamoyl, aryl and cycloalkyl groups or salt derivatives thereof. Phenyl portions of compounds of formula I may optionally be similarly mono- or poly-substituted.

The expression "non-toxic" used herein refers to an acceptably low level of toxicity when a compound is present at an effective amount, and not necessarily to a complete absence of toxic effects. In particular, compounds which have only a temporary toxic effect and do no significant permanent harm, will be referred to and understood as "non-toxic" herein. Particular toxic effects which are to be avoided in the compositions of the present invention are carcinogenicity, teratogenicity and mutagenicity.

The compound of formula I forming component (a1) of the preferred composition is preferably water-soluble or water-miscible, if necessary with the assistance of solubilising agents, but insoluble or non-miscible compounds may be used provided that they are emulsifiable or suspendible, if necessary with the assistance of emulsifying and/or suspending agents.

As a preferred compound of formula I there may specifically be mentioned triethylphosphate (R=$R^1$=$R^2$=ethyl), which is found to exhibit high activity, non-toxicity (within the above definition) and water-miscibility.

The carboxylic- acid ester forming component (a2) of the preferred composition is preferably a lower alkyl ester of a straight-chain fully or partially saturated $C_{2-20}$ alkyl mono- or poly-carboxylic acid. Particularly preferred esters include alkyl esters of fully or partially saturated straight-chain mono-, di- or tribasic carboxylic acids such as, for example, $C_{2-10}$ alkanoic, alkanedioic or alkanetrioic acids, more particularly $C_{2-8}$ alkanoic acids such as acetic acid, $C_{4-8}$ alkanedioic acids such as succinic acid (butanedioic acid), adipic acid (hexanedioic acid) or $C_{4-8}$ alkanetrioic acids. The alkyl groups forming the esters may suitably be selected from lower alkyl groups, more particularly methyl, ethyl, propyl, n-butyl and octyl. Alkyl portions of the ester of component (a2) may optionally be mono- or poly-substituted, for example by one or more substituents selected from halo, nitro, amino, $C_{1-4}$ alkylamino, di-$C_{1-4}$ alkylamino, hydroxy, $C_{1-4}$ alkoxy and $C_{2-4}$ alkanoyloxy groups or salt derivatives thereof. Particularly preferred esters include dimethyl succinate, diethyl succinate, dimethyl adipate, triacetin (1,2,3-propanetriol triacetate), tri-n-butyl citrate, n-octyl acetate and methyl octanoate, and mixtures thereof.

The $C_{4-12}$ alkanol forming component (a2) of the second preferred composition is preferably a branched $C_{4-10}$ alkanol, and most preferably an alkan-1-ol having one hydroxyl function and at least one (preferably one) alkyl side chain at the 2-position. A particularly preferred such alkanol is 2-ethyl-1-butanol.

The ester component (a2) is typically poorly soluble or non-soluble in the aqueous composition. This component is therefore typically present mainly in the "oil" phase of the emulsion.

It is a requirement of the invention that the composition exists as a stable microemulsion. The nature of the emulsion is, however, not necessarily the same across the full range of dilutions. For example, at low water levels, a "water-in-oil" microemulsion may exist, whereas at higher water levels the microemulsion form may be "oil-in-water" or a hybrid in which both forms may be found. On substantial dilution to yield the predominantly aqueous composition of WO 97/24409, it is found that the microemulsion state typically changes to an oil-in-water (non-micro) emulsion.

The surfactant component (b), is selected from nonionic water-soluble block copolymer(s) of more than one alkylene oxide. Block copolymers of ethylene oxide and propylene oxide are particularly suitable, as these can provide a wide range of emulsification and dispersant effects, optionally functioning also as gelling agents. Such copolymer surfactants typically have an approximate molecular weight in the range of about 8000 to about 16000 (e.g. about 12000) and an approximate hydroxyl value in the range of about 5 to about 15 mg KOH/g (e.g. about 8.5–11.5 mg KOH/g). Particularly preferred are block copolymers of ethylene oxide and propylene oxide in which the proportion (x) of the polyoxyethylene hydrophile in the copolymer (expressed as a percentage by weight) is approximately related to the molecular weight (y) of the polyoxypropylene hydrophobe by the formula $$y \geq 5000 - 40x$$

Such copolymers generally have an HLB value in the range of about 20 to 28, as determined chromatographically. Water-soluble Synperonic PE (TM) surfactants (ICI, England), e.g. of the F-series (referring to their flake appearance), may be mentioned as particularly preferred surfactants of component (b).

The surfactant may suitably be used in conjunction with a cosurfactant such as a simple organic alcohol, suitably a $C_{1-10}$ alkyl alcohol, for example a $C_{4-8}$ alkanol such as hexan-1-ol. Cosurfactants improve the strength and stability of the microemulsion produced by the surfactant component (b) and assist in reducing foaming of the composition.

It is most preferred, for safety reasons, that the organic components of the composition have a relatively high flash point (i.e. well above normal operating temperatures). It is also preferred, for convenience, that the organic components of the composition are liquid over the full range of normal operating temperatures. The composition may include additional components as desired. Such additional components may include conventional fillers, binders, stabilising agents, colorants and biocides. It is preferred, however, that no significant quantities of additional components are present, i.e. that the composition of the invention consists essentially of components (a), (b) and (c) as defined above.

The composition preferably contains substantially equal volumes of components (a1) and (a2). Surprisingly, this has been found to enhance the formation of a clear stable microemulsion, even at very low water levels where the formation of emulsions of any description becomes difficult.

The amount of water (component c) is less than about 50% by weight and/or volume, more typically less than about 40%, preferably less than about 30%, and most preferably from about 15 to about 25% by weight and/or volume of component (a) Component (a) is suitably present in an amount of up to about 90% by volume of the total composition. More preferably, as mentioned above, compounds (a1) and (a2) should both be present in approximately equal volumes, for example each up to about 45% by volume of the total composition, more preferably up to about 40% by volume of the total composition. For commercial transportation purposes, it is desirable to ship the composition at or approaching this preferred maximum concentration of component (a).

The surfactant component (b) is typically present in an amount up to about 10% by weight of the total composition, more preferably about 2 to 4% by weight. Minor cosurfactants such as hexanol may suitably comprise up to about 20% by weight of the surfactant component, more preferably up to about 5% by weight.

Any minor additional components will typically comprise up to about 10% of the weight of the composition, more preferably up to about 6% by weight.

If desired, the composition of the present invention can be diluted with water to levels of dilution disclosed in WO 97/24409, without, in many cases, substantial loss of activity. Alternatively, the composition can be used in its undiluted state.

It will be appreciated that the composition, in which a stable microemulsion is maintained at exceptionally high concentrations of organics, is highly unusual and surprising. Without wishing to be bound by theory, it is believed that a synergistic interaction between components (a1) and (a2) occurs, probably involving the partitioning effect described for the dilute composition in WO 97/24409. By a mechanism which is not yet fully understood, the components (a), (b) and (c) cooperate in the present invention to cause a stable microemulsion which both has effective coating removal/softening power as such and substantially retains its emulsion stability (normally with somewhat larger emulsion droplets, leading to somewhat more milkiness) and coating removal/softening power on dilution with water, e.g. to the levels of dilution described in WO 97/24409.

The compositions of the present invention generally should be prepared with some care, in order to arrive at the required stable microemulsion. The general preparative method described in WO 97/24409 should be followed, with the following modifications.

As in the prior art, the water and surfactant components are mixed first, and in the present invention all the water is preferably mixed with the surfactant components initially. Moreover, any minor additional components (e.g. biocides) should preferably also be mixed with the surfactant components initially.

This initial mixing will preferably take place slowly, with stirring, to fully dissolve the surfactant components. This should produce a concentrated surfactant solution containing up to about 40% by weight of surfactant, more typically between about 15 and 30% by weight.

To this solution is then added a large volume excess, e.g. from about 1 to about 5, more preferably about 4, times its own volume, of component (a), preferably as substantially equal part-volumes of components (a1) and (a2), again slowly and with stirring.

Components (a1) and (a2) are typically added separately, the less soluble component first, until an emulsion is formed. At such low levels of water, gel phases and multiphasic (e.g. liquid/solid, liquid/gel, liquid/liquid, gel/solid) systems may occur at various stages during the addition of components (a1) and (a2). However, as the final proportions of components (a1) and (a2) are approached on adding the second of the components, the microemulsion will stabilise and the addition of the component will then be stopped.

Further stirring of the mixture is often desirable, to ensure complete mixing and emulsification.

The compositions of the present invention can be used as they are, or can be diluted with water under conditions of agitation (e.g. stirring) and optionally thickened to produce compositions according to WO 97/24409. The materials and methods for achieving such thickening are fully described in WO 97/24409, and will not be repeated here.

In concentrated form, the compositions of the present invention can be used to replenish the active agents in paint, lacquer and varnish stripping baths, in which articles are dipped for softening and removing the paint etc, and which use unthickened compositions according to WO 97/24409.

Alternatively, the concentrated compositions of the present invention can be thickened without prior dilution, to produce thickened highly active aqueous compositions for removing organic coatings from a surface.

Thickening a stable microemulsion containing the components (a1) and (a2) at water levels of less than 50% is not necessarily an easy task, if the stability, activity and other desirable properties of the microemulsion is to be retained.

We have, however, found surprisingly that by careful selection of the rheology control (thickening) agents used, the stable microemulsion of the present invention can be effectively thickened without loss of stability or activity.

In particular, the rheology control agent should be selected from the following:
1. Amide-modified hydrogenated castor oil based thixotropes;
2. Polyamide organic rheological additives;
3. Combinations of fumed (pyrogenic) silicas and polymer wax antisettling agents; and
4. Mixtures thereof.

As examples of suitable amide modified hydrogenated castor oil based thixotropes there are particularly mentioned white or off-white micronised powder thixotropes appropriate to solvent-based systems, which have limited solubility in the solvent and a tendency to swell in the solvent to some extent. The resultant suspension of finely divided, uniformly swollen thixotrope particles forms a supporting network for the thickened composition. One such rheology control agent that has been found to be particularly suitable is CRAYVALLAC MT (trade mark), available from Cray Valley Limited, Newport, UK (tel: +44 1633 440356).

As examples of suitable polyamide organic Theological additives there are particularly mentioned white or off-white micronised non-organoclay non-hydrogenated-castor-oil based additives (e.g. polyamide waxes) appropriate to solvent-based systems, which have controlled thixotropic characteristics and good sag resistance whilst maintaining good flow and levelling and application properties such as build in the thickened composition. One such additive that has been found to be particularly suitable is CRAYVALLAC SUPER (trade mark), available from Cray Valley Limited, Newport, UK (tel: +44 1633 440356).

As examples of suitable combinations of fumed silicas and polymer wax antisettling agents there are particularly mentioned white or off-white liquid polymer wax antisettling additives used in association with sufficient fumed (pyrogenic) silica powder to adjust the rheology to the desired characteristics. The precise ratios of the components are readily determined by one of ordinary skill in this art. As fumed silicas the hydrophobic grades are generally preferred. Such silicas are not substantially wetted by water and in powder form they tend to float on water. They are characterised by a reduced number of surface silanol (Si—OH) groups (typically less than about 40% of the number present at the surface of hydrophilic fumed silicas), the remainder converted to hydrophobic modified forms such as dialkylsilylated forms (e.g. Si—O—Si(CH$_3$)$_2$). The fumed silicas are available as fine white powders, dry or in a carrier liquid, having an average primary particle size typically in the range of about 5 to about 20 nm. One such combination of wax and silica that has been found to be particularly suitable is M-P-A 2000X (registered trade mark), available from NL chemicals, Hightstown, New Jersey, USA (tel: +1 609 443 2500) (when used either as a white solid wax after evaporating off the carrier solvent in which it is supplied, or alternatively in solvent) in association with a sufficient amount of a fumed silica such as HDK-NZO (trade mark), available from Wacker, or AEROSIL (hydrophobic grade), available from Degussa AG (tel: +49 6181 59 32 49).

The rheology control agent, when present, is suitably used in an amount of up to about 8% by weight, for example about 5%. High shear mixing is preferably used, and the resultant temperature rise should be controlled to no more than about 60° C., preferably 50–55° C.

The thickened composition according to the present invention preferably exists as a thick white or off-white gel-like material capable of supporting its own weight and giving thick coats onto a vertical surface. After application to the vertical surface, the composition does not dry quickly and can easily be washed or wiped off, together with the degraded coating material, or can be removed by relatively mild mechanical scraping or stiff brushing.

Whether in concentrated or diluted form, the compositions of the present invention have the following utility:
1. They are active in softening or plasticising paints, varnishes and lacquers prior to stripping the same from a surface.
2. They are active in removing many forms of organic stains, marks or thin coatings from surfaces, for example degraded/resinified oils, spray-paint (e.g. graffiti), tars, inks, magic marker inks, foodstuffs, greases, dirt and animal secretions.
3. They are active in cleaning or restoring utensils and implements which have become contaminated with the coatings and similar materials already mentioned, for example paint brushes and rollers after painting.

There is a general need for a quick-acting easily-applicable fluid for removing difficult organic coatings such as graffiti paint or ink. In this area a particular requirement is that the composition should be thickened to an extent which prevents immediate run-off from a vertical surface, yet sprayable from a pressurised or pressurisable container and fast-acting so that the fluid and degraded coating can be washed or wiped off soon after the fluid has been applied. The pressurisable container may, for example, be a simple hand-held home spray container in which a low pressure spray is generated by a squeezing action of the hand.

We have found, surprisingly, that the compositions of both the present invention and WO 97/24409 can be effectively thickened for use as quick-acting easily-applicable (e.g. sprayable) fluids for removing difficult organic coatings such as graffiti paint or ink, by using a hydrophillic rheology control agent (thickener) selected from the group consisting of cross-linked non-acrylic hydrolysable vinyl ether/maleic anhydride copolymers.

Particular examples of such copolymers include alkyl (e.g. C$_{1-4}$ alkyl such as methyl) vinyl ether/maleic anhydride copolymers cross-linked with an alkadiene such as 1,9-decadiene. Upon hydrolysis with water the maleic anhydride rings are hydrolysed to give free diacid groups and the polymer has the following schematic representation (II):

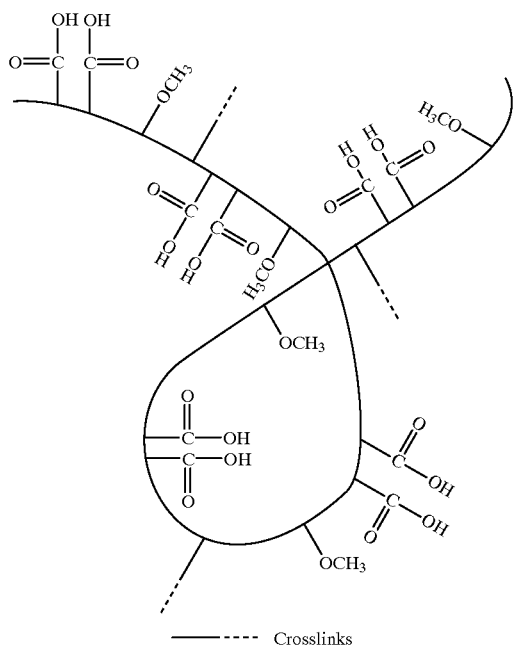

---- Crosslinks

Most preferred are such polymers which are available as white or off-white powders, having a moisture content of less than about 10% and a particle size less than about 1000 μnm.

Vinyl ether/maleic anhydride copolymers are acidic on contact with water and are suitably adjusted to maximum viscosity between pH 3.0 and pH 8.0 (e.g. about pH 7.0) by addition of base.

The thickened emulsion of the present invention exhibits shear thinning behaviour, typically showing a high yield value or initial resistance to flow.

Preferred yield values (Brookfield) in a laboratory model gel system using these thickening agents and containing 0.25% suspended sand solids (gel neutralised to pH 7 with sodium hydroxide) are in the range of approximately 2,100 to 2,600 (temperature range 55° C.–28° C. respectively), more particularly 2,200 to 2,500 dynes cm$^{-2}$; in a gel system containing 0.75% suspended sand solids (gel neutralised to pH 7 with sodium hydroxide) preferred yield values (Brookfield) are in the range of approximately 5,800 to 6,600 (temperature range 55°–28° respectively), more particularly 5,900 to 6,500 dynes cm$^{-2}$. In all cases the sand is suspended indefinitely, without loss of the suspension over time.

One particularly preferred such thickener is STABILEZE 06 (registered trade mark), available from International Speciality Products, UK (tel: +44 161 998 1122). An alternative, but less preferred, such thickener is STABILEZE QM, available from the same source.

In accordance with a further aspect of the present invention, therefore, there is provided an aqueous composition for removing organic coatings from a surface, comprising:
(a) an effective amount of a non-toxic compound having activity in plasticising or softening organic coatings;
(b) an effective amount of at least one surfactant to allow the composition to exist as a stable emulsion;
(c) water; and
(d) an effective amount of a hydrophilic rheology control agent selected from the group consisting of cross-linked non-acrylic hydrolysable vinyl ether/maleic anhydride copolymers.

The plasticising/softening component (a) will suitably be selected from such components as described above or disclosed in WO 97/24409, and will suitably be used in the amounts described.

The surfactant(s) component (b) will suitably be selected from such components as described above or disclosed in WO 97/24409, and will suitably be used in the amounts described.

The water component (c) will suitably be used in the amounts described above or disclosed in WO 97/24409.

The rheology control agent component (d) will suitably be selected from such components as described above, and will suitably be used in amounts of up to about 5% by weight (more preferably up to about 4% by weight, for example between about 0.2% and 1.0% by weight, typically about 0.5% by weight) with base neutralisation to about pH 7.

It is most preferred that the components (a) to (c) will be used in the amounts disclosed in WO 97/24409, i.e. the relatively dilute formulation in which water is the predominant component. The composition is conveniently prepared by simply adding the hydrophilic rheology control agent to the known composition from WO 97/24409, with stirring, allowing the temperature to rise and then neutralising to pH 7 or slightly above (e.g. with sodium hydroxide or another strong base), followed by optional further stirring at the elevated temperature reached by the system.

The composition according to this further aspect of the present invention has excellent utility as a spray-on graffiti remover or other cleaning preparation active against difficult organic coatings on difficult or irregular surfaces (e.g. stone, brick or concrete). The composition may be easily sprayed through a spray nozzle, e.g. using a simple hand-squeeze spray container, without blocking the nozzle. The sprayed composition is fluid and will spread somewhat, to fill the contours of irregular surfaces. The sprayed composition clings to vertical surfaces and does not flow off. It produces a film of appreciable thickness, even on a vertical surface, which does not dry out before the coating-softening action is completed. The film can be easily washed or wiped off the surface when the cleaning action is completed, or removed by mild mechanical scraping or other action.

The following non-limiting Examples are included for further illustration of the invention.

EXAMPLE 1

Concentrated Unthickened Composition of Dimethyl Adipate/Triethyl Phosphate

For an approximately 1 liter batch the following formulation was used:

| Active compounds | |
| --- | --- |
| Triethyl Phosphate (component a1) | 400 cm$^3$ |
| Dimethyl adipate (component a2) | 400 cm$^3$ |
| Surfactant (compound b) | |
| Synperonic F127 (TM) | 40 grams |
| Co-surfactant | |
| Hexan-1-ol | 1 cm$^3$ |
| Biocide | |
| Germaben (TM) (Blagdon Chemicals, England) | 1 cm$^3$ |
| Other | |
| Water (component c) | 160 cm$^3$ |

Method of Preparation

In a large diameter vessel a concentrated surfactant solution was prepared. The water was first added to the vessel, followed by the hexan-1ol and then the biocide added slowly, with stirring using a low speed simple paddle stirrer or propeller blade stirrer.

The Synperonic F127 was then added slowly with stirring using the same stirrer and allowed to fully dissolve. The stirring rate was approximately 300 rpm; the addition time minimum 30 minutes; stirring time at least 12 hours.

To the resultant surfactant solution the dimethyl adipate was then added very slowly with stirring (stirring speed and equipment as above). After a small amount of dimethyl adipate had been added a very thick gel began to form subsequent slow addition of the dimethyl adipate created a more fluid gel until, on addition of the last dimethyl adipate, a clear fluid with gelled particles was obtained. These gelled particles did not disperse or dissolve on standing.

The triethyl phosphate was then added slowly, again with stirring. After partial addition some clearing of the gelled particles was seen; after further addition the clearing continued and additionally a biphasic solution was seen. On addition of the last triethylphosphate a stable, clear, water-like, microemulsion was obtained, Stirring was continued for about 15 minutes.

The composition has been found to have the following uses:

1. It can be used as a concentrate to replenish the active agents in stripping baths which use unthickened compositions according to WO 97/24409, Example 1;
2. It can be diluted, e.g. about 4-fold, with water to obtain an unthickened composition substantially similar to WO 97/24409, Example 1, which in turn can be thickened using Laponite RD or other rheology control agents in appropriate amounts, according to the final stage of WO 97/24409, Example 2.

In both these uses, the dilution of the microemulsion results in a stable white milky emulsion to form, as is found in Example 1 of WO 97/24409. In both uses, agitation, e.g. by stirring, is essential when the microemulsion is added to the diluting material.

Still further:

3. The composition can be used as an unthickened surface cleaner and/or softener of paint, varnish, lacquer etc, particularly in situations where the water-like clarity of the composition is a desirable advantage outweighing the commercial disadvantage of the high organic concentration and the low water content.

EXAMPLE 2

Concentrated Unthickened Composition of Dimethyl Adipate/Triethyl Phosphate

An approximately 200 cm$^3$ batch was prepared using the ingredients and method of Example 1 with the exception that, after addition of the Synperonic F127 surfactant, 40 cm$^3$ of that resultant surfactant solution were taken and only 80 cm$^3$ each of the dimethyl adipate and the triethyl phosphate were added to the 40 cm$^3$ of resultant surfactant solution taken.

The product and its advantages/uses are discussed in Example 1.

EXAMPLE 3

Concentrated Thickened Composition of Dimethyl Adipate/Triethyl Phosphate

An approximately 100 cm$^3$ batch was prepared by placing 100 cm$^3$ of the product of Example 2 in a vessel and stirring the composition with a Silverson high speed stirrer fitted with a screen.

A sufficient amount of the commercially supplied xylene solution of polymer wax thickener M-P-A-2000X was allowed to dry in air to remove the xylene, and 2.77 g of the resulting wax were then added slowly to the vessel, with stirring for a further 30 minutes to allow the wax to disperse. A temperature rise to about 45° C. was observed.

2 g of fumed silica HDK-NZO were then added to the composition in the vessel, again with stirring, and the stirring continued for a further 15 minutes.

The product is a white mobile slimy fluid which does not sediment or phase-separate on standing. Its properties in cleaning/softening organic coatings are better than methylene chloride paint strippers.

EXAMPLE 4

Concentrated Thickened Composition of Dimethyl Adipate/Triethyl Phosphate

A double batch (400 cm$^3$) of the product of Example 2 was placed in a vessel and stirred in the way described in Example 3.

20g of CRAYVALLAC SUPER thickener were added slowly into the vortex of the stirrer. Stirring was continued for a further 30 minutes to allow the thickener to disperse, during which time the temperature rose to about 50–55° C. After about 4 minutes an increase in the viscosity was observed. A progressively increasing viscosity was seen and it became necessary to move the stirrer mechanically in the thickened solution, to ensure complete mixing.

The product is a thick white gel capable of supporting its own weight to significant thicknesses. It does not sediment or phase-separate on standing. Its properties in cleaning/softening organic coatings are better than methylene chloride paint strippers.

EXAMPLE 5

Concentrated Thickened Composition of Dimethyl Adipate/Triethyl Phosphate

Example 4 was repeated using 20 g of CRAYVALLAC MT in place of the 20 g of CRAYVALLAC SUPER. The resulting product was similar.

EXAMPLE 6

Sprayable Thickened Composition of Dimethyl Adipate/Triethyl Phosphate

A one liter batch of the product of Example 1 of WO 97/24409 was placed in a vessel and stirred in the way described in Example 3 above.

4 g of STABILEZE 06 thickener (powder) were added slowly into the vortex of the stirrer, over a period of about 15 minutes. Stirring was continued for a further 30 minutes to allow the thickener to disperse, during which time the temperature rose to about 35° C.

The mixture was then neutralised to pH 7.0 or slightly above by adding 2M sodium hydroxide solution dropwise to the shear-stirred mixture over a period of about 30 minutes. Increases in the viscosity and temperature were observed during this period. The neutralised mixture was stirred for a further 15 minutes to ensure complete dispersion and neutralisation.

The product is a white or translucent mobile silky fluid containing some air bubbles. It will cling acceptably to vertical surfaces and will spread to fill the contours of irregular surfaces such as brick, stone or concrete. It does not sediment or phase-separate on standing. Its properties in cleaning/softening organic coatings are better than-methylene chloride paint strippers. Moreover, the product is sprayable from a conventional hand-squeeze household spray container or the like, so offering potential use as a graffiti remover or as a composition for removing other difficult coatings from difficult (e.g. irregular and/or vertical) surfaces.

What is claimed is:

1. A composition for softening or removing organic coatings, the composition comprising:
   (a) an effective amount of a mixture of (a1) at least one non-toxic compound of formula I

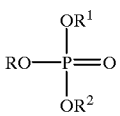

wherein R,R$^1$ and R$^2$, which may be the same or different represent lower allyl, phenyl or lower alkyl-phenyl groups and (a2) at least one non-toxic lower alkyl ester of a C$_{2-20}$ carboxylic acid or at least one non-toxic C$_{4-12}$ alkanol;
   (b) an effective amount of at least one surfactant to allow the composition to exist as a stable emulsion, the surfactant(s) being selected from nonionic water-soluble block copolymers of more than one alkene oxide;
   (c) water, and
   characterized in that component (c) (water) is present in an amount of less than about 50%, by weight and/or volume of component (a) and in that the composition exists as a stable microemulsion.

2. A composition according to claim 1, in which the compound of formula I is triethylphosphate.

3. A composition according to claim 1, in-which (a2) comprises an alkyl ester of a fully or partially saturated straight-chain mon-, di- or tri-basic carboxylic acid, the alkyl portions being optionally mono- or poly-substituted.

4. A composition according to claim 3, in which the carboxylic acid is a C$_{2-10}$ alkanoic, alkanedioic or alkanetrioic acid.

5. A composition according to claim 3 in which (a2) comprises dimethyl succinate, diethyl succinate, dimethyl adipate, 1,2,3-propanetriol triacetate, tri-n-butyl citrate, n-octyl acetate, methyl octanoate or mixtures thereof.

6. A composition according to claim 1, in which (a2) comprises a branched C$_{4-10}$ alkanol.

7. A composition according to claim 6, in which the alkanol is an alkan-1-ol having one hydroxyl function and at least one alkyl side chain at the 2-position.

8. A composition according to claim 6, in which the alkanol is 2-ethyl-1-butanol.

9. A composition according to claim 1, in which (b) comprises a block copolymer of ethylene oxide and propylene oxide having an approximate molecular weight in the range of about 8000 to about 16000.

10. A composition according to claim 9, in which the proportion (x) of the polyoxyethylene hydrophile in the copolymer (expressed as a percentage by weight) is approximately related to the molecular weight (y) of the polyoxypropylene hydrophobe by the formula $$y \geq 5000 - 40x.$$

11. A composition according to claim 1, in which (b) is used in conjunction with a $C_{1-10}$ alkyl alcohol as cosurfactant.

12. A composition according to claim 1, in which the water (c) is present in an amount of less than about 40% by weight and/or volume of component (a).

13. A composition according to claim 1, in which the water (c) is present in an amount of less than about 30% by weight and volume of component (a).

14. A composition according to claim 1, in which the water (c) is present in an amount of less than about 25% by weight and/or volume of component (a).

15. A composition according to claim 1, in which (a1) is present in an amount of up to about 45% by volume of total composition and (a2) is present in an amount of up to about 45% by volume of total composition.

16. A composition according to claim 1, in which a rheology control agent is further present.

17. A composition according to claim 16, in which the rheology control agent is selected from amide-modified hydrogenated castor oil based thixotropes, polyamide organic Theological additives, combinations of fumed (pyrogenic) silicas and polymer wax antisettling agents, and mixtures thereof.

18. A composition according to claim 16, in which the rheology control agent comprises a hydrophilic agent selected from the group consisting of cross-linked non-acrylic hydrolysable vinyl ether/maleic anhydride copolymers.

19. A composition for softening or moving organic coatings, the composition comprising:

(a) an effective amount of a mixture of (a1) at least one non-toxic compound of formula I

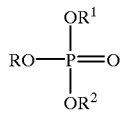

wherein $R, R_1$ and $R^2$, which may be the same or different represent lower alkyl phenyl or lower alkylphenyl groups and (a2) at least one non-toxic lower alkyl ester of a $C_{2-20}$ carboxylic acid or at least one non-toxic $C_{4-12}$ alkanol;

(b) an effective amount of at least one surfactant to allow the composition to exist as a stable emulsion, the surfactant(s) being selected from nonionic water-soluble block copolymers of more than one alkylene oxide;

(c) water; and (d) an effective amount of hydrophilic rheology control agent selected from the group consisting of cross-linked non-acrylic hydrolysable vinyl ether/maleic anhydride copolymers;

characterized in that component (c) (water) is present in an amount of less than about 50% by weight and/or volume of component (a) and in that the composition exists as a stable microemulsion.

20. A composition according to claim 19, in which the components (a), (b), (c) and (d) are present in such amount that the composition is capable of rendering graffiti paint or ink removable from a surface by washing or wiping after application of the composition to the paint or ink.

21. The composition of claim 1 in a container comprising a reservoir holding the liquid, a nozzle and duct means for conveying the liquid under pressure from the reservoir to the nozzle from ejection of the liquid through the nozzle.

22. A composition according to claim 21, which the nozzle is a spray nozzle.

23. The composition of claim one further including a hydrophilic rheology control agent selected from the group consisting of cross-linked non-acrylic hydrolysable vinyl ether/maleic anhydride copolymers, for the purpose of imparting, to an aqueous system containing emulsified agents having activity for removing organic coatings from a surface, clingability to a vertical surface without substantially adversely affecting contour fillability on an irregular surface and nozzle non-blocking sprayability, or for enhancing such clingability inherently present in the aqueous system.

* * * * *